US012774714B2

(12) United States Patent
Knapp

(10) Patent No.: US 12,774,714 B2
(45) Date of Patent: Oct. 27, 2026

(54) CONNECTOR FOR TWO COMPONENTS

(71) Applicant: Knapp Holding GmbH, Euratsfeld (AT)

(72) Inventor: Friedrich Knapp, Bad Kreuzen (AT)

(73) Assignee: Knapp Holding GmbH, Euratsfeld (AT)

( * ) Notice: Subject to any disclaimer, the term of this patent is extended or adjusted under 35 U.S.C. 154(b) by 190 days.

(21) Appl. No.: 18/868,948

(22) PCT Filed: May 11, 2023

(86) PCT No.: PCT/EP2023/062578
§ 371 (c)(1),
(2) Date: Nov. 25, 2024

(87) PCT Pub. No.: WO2024/002575
PCT Pub. Date: Jan. 4, 2024

(65) Prior Publication Data

US 2026/0226936 A1 Aug. 6, 2026

(30) Foreign Application Priority Data

Jul. 1, 2022 (EP) .................................... 22182514

(51) Int. Cl.
*F16B 37/00* (2006.01)
*F16B 37/02* (2006.01)
(Continued)

(52) U.S. Cl.
CPC ........ *F16B 37/0842* (2013.01); *F16B 37/064* (2013.01); *F16B 37/0857* (2013.01)

(58) Field of Classification Search
CPC ...... F16B 37/02; F16B 37/0842; F16B 21/18; F16B 21/12; F16B 37/0857; F16B 37/064
(Continued)

(56) References Cited

U.S. PATENT DOCUMENTS 2,378,957 A 6/1945 Tinnerman
2,401,672 A * 6/1946 Tinnerman ............ F16B 5/0208 411/437
(Continued)

FOREIGN PATENT DOCUMENTS

DE 102018200021 A1 * 7/2019 .......... F16B 37/0842
EP 1281876 A1 * 2/2003 .......... F16B 37/0842
(Continued)

OTHER PUBLICATIONS

Extended European Search Report dated Dec. 16, 2022.
(Continued)

*Primary Examiner* — Rodney B White
(74) *Attorney, Agent, or Firm* — Hoffmann & Baron, LLP

(57) ABSTRACT

Connector for two components, in particular wood components, comprising a plate which is connectable to the first of the two components with a top side and a bottom side, an opening which extends through the plate from the top side to the bottom side and at least two spring tongues distributed around the periphery of the opening, which each project radially into the opening and project out of the plate plane at an acute angle on the top side of the plate, wherein a clear width remains between their free ends, and a threaded bolt connectable to the second of the two components, the diameter of which exceeds the clear width that remains between the free ends of the spring tongues, wherein the free end of each spring tongue has a double-thread or multi-thread threaded portion corresponding to the thread of the threaded bolt.

12 Claims, 3 Drawing Sheets

(51) Int. Cl.
*F16B 37/06* (2006.01)
*F16B 37/08* (2006.01)

(58) Field of Classification Search
USPC .......................................... 411/427, 433, 437
See application file for complete search history.

(56) References Cited

U.S. PATENT DOCUMENTS

| | | | | |
|---|---|---|---|---|
| 4,728,236 A * | 3/1988 | Kraus | F16B 37/0842 | 411/525 |
| 4,828,444 A * | 5/1989 | Oshida | F16B 37/043 | 411/908 |
| 4,859,129 A * | 8/1989 | Kraus | F16L 3/237 | 411/908 |
| 4,990,044 A * | 2/1991 | Kimak | F16B 37/0842 | 411/372.5 |
| 4,999,019 A * | 3/1991 | Kraus | F16B 37/0842 | 411/908 |
| 5,775,862 A | 7/1998 | Cullen | | |
| 5,785,477 A * | 7/1998 | McGuffey | F16B 37/02 | 411/432 |
| 5,816,762 A * | 10/1998 | Miura | F16B 37/0842 | 411/908 |
| 6,672,814 B1 * | 1/2004 | Kotlarski | B60S 1/0488 | 15/250.31 |
| 6,997,662 B2 * | 2/2006 | Nishikawa | B62D 27/065 | 411/525 |
| 7,207,762 B2 * | 4/2007 | Teal | F16B 37/065 | 411/113 |
| 7,950,886 B2 * | 5/2011 | Siegal | F16B 39/22 | 411/525 |
| 8,371,784 B2 * | 2/2013 | Siegal | F16B 39/22 | 411/525 |
| 8,439,620 B2 * | 5/2013 | Mellyn | F16B 37/0807 | 411/188 |
| 8,764,362 B2 * | 7/2014 | Siegal | F16B 39/22 | 411/525 |
| 8,950,993 B2 * | 2/2015 | Gagne | F16B 37/08 | 411/433 |
| 9,267,532 B2 * | 2/2016 | Siegal | F16B 39/106 | |
| 9,309,033 B2 * | 4/2016 | Dorsey | B65D 63/00 | |
| 9,464,657 B2 * | 10/2016 | Rosas Roman | F16B 37/065 | |
| 10,935,066 B2 * | 3/2021 | Mallard | B62D 27/06 | |
| 12,092,145 B2 * | 9/2024 | Jessop | F16B 37/0842 | |
| 12,391,091 B2 * | 8/2025 | Bielicki | B60H 1/00535 | |
| 2009/0067948 A1 * | 3/2009 | Chung | F16B 37/14 | 411/429 |
| 2013/0071205 A1 * | 3/2013 | Kuehn | F16B 21/20 | 24/457 |
| 2015/0377277 A1 * | 12/2015 | Downey | F16B 37/0842 | 411/519 |
| 2019/0264725 A1 * | 8/2019 | Forti | F16B 5/0208 | |
| 2022/0299062 A1 * | 9/2022 | Kempf | F16B 5/0628 | |
| 2025/0012313 A1 * | 1/2025 | Li | F16B 37/0842 | |

FOREIGN PATENT DOCUMENTS

| | | | | |
|---|---|---|---|---|
| EP | 4411152 A1 * | 8/2024 | F16B 37/0842 | |
| FR | 2745048 A1 * | 8/1997 | F16B 37/0842 | |
| WO | WO-2021137797 A1 * | 7/2021 | F16B 37/0842 | |

OTHER PUBLICATIONS

International Search Report and Opinion issued in International Application No. PCT/EP2023/062578 dated May 11, 2023.

International Preliminary Report on Patentability issued in International Application No. PCT/EP2023/062578 on Dec. 18, 2024.

* cited by examiner

CONNECTOR FOR TWO COMPONENTS

CROSS-REFERENCE TO RELATED APPLICATIONS

This application is a National Phase application of International Application No. PCT/EP2023/062578 filed May 11, 2023, which claims priority to the European Patent Application No. 22 182 514.4 filed Jul. 1, 2022, the disclosures of which are incorporated herein by reference.

TECHNICAL FIELD

The present disclosed subject matter relates to a connector for two components, in particular wood components. The connector comprises a plate connectable to the first of the two components, having a top side and a bottom side, an opening passing through the plate from the top side to the bottom side and at least two spring tongues distributed around the periphery of the opening, which each project radially into the opening and project at an acute angle out of the plate plane on the top side of the plate, wherein a clear width remains between their free ends. The connector further comprises a threaded bolt connectable to the second of the two components, the diameter of which exceeds the clear width remaining between the free ends of the spring tongues.

BACKGROUND

Connectors of this kind are known e.g. as internal tooth locking rings, locking washers or clamping discs. A threaded screw or the like is secured behind a bore with such an internal tooth locking ring. The spring tongues protruding on the top side from the plate plane allow the screw to be simply inserted or pressed into the opening as far as necessary in one normal direction on the plate plane, namely in the direction from the bottom side to the top side of the plate, with its thread connecting with the free ends of the spring tongues. In the locked position, the screw is locked in the opposite other normal direction at the free ends of the spring tongues and cannot be pulled out: a pulling force in this other normal direction causes a radial force outwards on the plate or the retaining ring via the spring tongues (or internal teeth) and their acute angles, which the plate or the retaining ring absorbs, i.e. resists.

An internal tooth retaining ring allows for faster securing than e.g. a conventional screw connection with a screw and nut, and—in contrast to an adhesive bond for example—allows immediate tensile loading in the other normal direction mentioned and, if necessary, subsequent loosening of the connection by unscrewing the screw.

For low tensile loads, such connectors made of a threaded screw and internal tooth locking ring are advantageous and practical for connecting two small or flat components of any type or nature. However, this principle is not readily applicable to larger components and higher tensile loads, such as those often encountered in timber construction, as conventional internal tooth locking rings are unable to absorb the loads that occur due to their design and size. It has also been found that a simple enlargement of the internal tooth locking rings is not sufficient to reliably withstand the occurring forces, since the tensile strength does not increase in proportion to the enlargement of the component and the available space is limited.

In order to make the principle described usable for larger tensile forces, a connector is known for example from U.S. Pat. No. 2,378,957 A, in which the free end of each spring tongue also has a collar portion directed in one of the two normal directions to the plane of the plate, on which a double-thread or multi-thread threaded portion corresponding to the thread of the threaded bolt is formed.

BRIEF SUMMARY

The aim of the disclosed subject matter is to create a connector for two components which allows for the easy production of the threaded portions and an adjustment to different threaded bolts.

This aim is achieved with a connector of the aforementioned kind, in which the free end of each of its spring tongues has a double-thread or multi-thread threaded portion corresponding to the thread of the threaded bolt, and which is distinguished in that the free end of each spring tongue is provided with an end cap on which the threaded portion is formed.

When the threaded bolt is inserted or pressed into the opening in the said one normal direction (from the bottom side to the top side), its thread engages with the two or more threads of the threaded portions. In this locked position, the threaded bolt is securely locked in the opposite other normal direction. The double-thread or multi-thread threaded portions corresponding to the threaded bolt provide significantly better force transmission from the threaded bolt to the spring tongues than a conventional internal tooth locking ring, where generally only narrow segments of the free ends of often only some of the spring tongues engage with the screw thread. As a result, a significantly higher force can be safely transmitted to and reliably absorbed by the part of the plate surrounding the opening, without the connector having to be excessively enlarged. The solution according to the disclosed subject matter can be applied to connectors of any size and furthermore allows for easy handling by axial insertion and locking of the threaded bolt in the one normal direction, secure locking in the other normal direction and the optional release of the connection by unscrewing the threaded bolt.

The end cap makes it possible to manufacture the threaded portion independently of the plate and the spring tongues and to only provide the free ends of the spring tongues with the end caps afterwards. The end caps can be permanently attached to the spring tongues, e.g. bonded, welded, crimped etc. It is particularly advantageous if the end caps are removable. This allows the same plate to be fitted with different end caps as required. For example, the end caps can be adapted to the thread bolts used only at a construction site, by fitting end caps with the corresponding thread pitch and/or shape. Optionally, end caps that have already been fitted can also be replaced.

Depending on the material of the components, the plate and the threaded bolt, it is particularly advantageous in one variant if the end caps are made of metal. This creates a robust, electrically and thermally highly conductive connection between the plate and threaded bolt, if desired. In an alternative variant, the end caps are made of plastic. This provides a simple way of achieving good electrical and thermal insulation between the plate and the threaded bolt and between the two components, if preferred.

The plate can be made of any material sein, e.g. plastic, in particular fiber-reinforced plastic, or wood. In an optional embodiment, the plate is made of metal, e.g. spring steel. The plate is then particularly strong and can optionally be manufactured in one piece with the spring tongues. This simplifies the structure and also provides high stability.

The threaded bolt can also be made of any material, e.g. plastic, in particular fiber-reinforced plastic, or wood, and can also be made from a different material to the plate. Due to its strength and good machinability, the threaded bolt is optionally made of metal.

It is particularly advantageous, if the said acute angle is between 5° and 60°, optionally between 10° and 30°, relative to the plane of the plate. In this way, the threaded bolt can be moved into its locked position particularly easily in the said one normal direction, and it is then locked particularly securely in the said other normal direction.

The spring tongues of the plate can be distributed as needed around the periphery of the opening, e.g. in mirror symmetry. It is particularly beneficial if the spring tongues are distributed evenly around the periphery of the opening, so that the same angle is formed between two adjacent spring tongues. This results in a particularly even distribution of force from the threaded bolt to the plate.

The plate can be bonded or screwed to the said first component and/or engages behind the first component. It is advantageous if the plate has two or more fastening bores distributed around the opening for connection to the first component. This allows the plate to be used in any of the aforementioned ways and in particular to be screwed to the first component.

It is also beneficial if the threaded bolt has a flange for connecting to the second component. The flange can also have fastening bores for this purpose and/or be bonded, welded or the like to the second component or engage behind it.

BRIEF DESCRIPTION OF THE DRAWINGS

The disclosed subject matter is explained in more detail in the following, with reference to the examples shown in the accompanying drawings. In the drawings.

DETAILED DESCRIPTION

Figure 1:
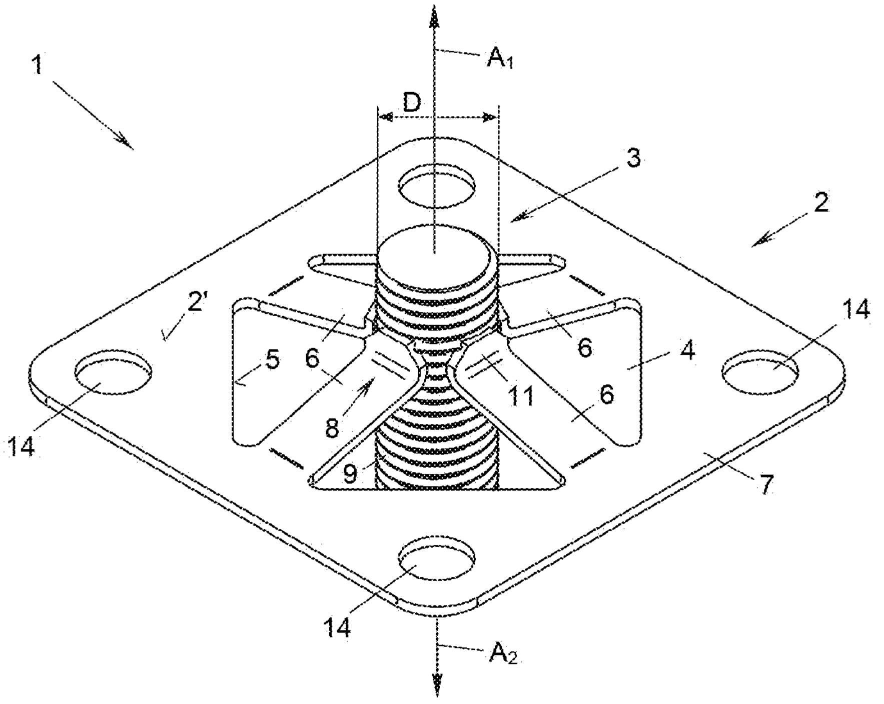
FIG. 1 shows a connector for two components, which comprises a plate and a threaded bolt, in a perspective view from above.

FIG. 1 shows a connector 1 for two components (not shown). The components can have any shape and be made from any material, in particular wood, or metal, concrete, plastic, composite, brick etc. The connector 1 comprises a plate 2, which can be connected to the first of the two components, and a threaded bolt 3, which can be connected to the second of the components.

According to FIGS. 1 and 2*a* to 2*c*, the plate 2 has an optional central opening 4, which passes through the plate 2 from its top side 2' to its bottom side 2". In the opening 4, the plate 2 has at least two (here: four) spring tongues 6 distributed around the periphery 5 of the opening 4. The spring tongues 6 each project radially into the opening 4 and, at the same time, on the top side 2' of the plate 2 at an acute angle α from the plate plane ε (here: from the part 7 of the plate 2 that lies around the opening 4 and the spring tongues 6).

As shown in the example, the opening 4 does not have to be circular; said radial orientations of the spring tongues 6 always denote (radial) directions $R_1$, $R_2$, . . . generally $R_i$, of the respective spring tongues 6 (in a plan view of FIG. 2*b*) from their root at the periphery 5 of the opening 4 into the interior of the opening 4.

In the example shown, the spring tongues 6 are integral with the part 7 of the plate 2 lying around the opening 4 and are bent at an acute angle α with respect to the plate plane ε in the region of their respective root on the periphery 5 of the opening 4. Alternatively, the spring tongues 6 could be welded, bonded, clamped, crimped or attached in some other way at this angle α with respect to the plate plane ε at their roots to the surrounding part 7 of the plate 2 on the periphery 5 of the opening 4.

Figure 2A:
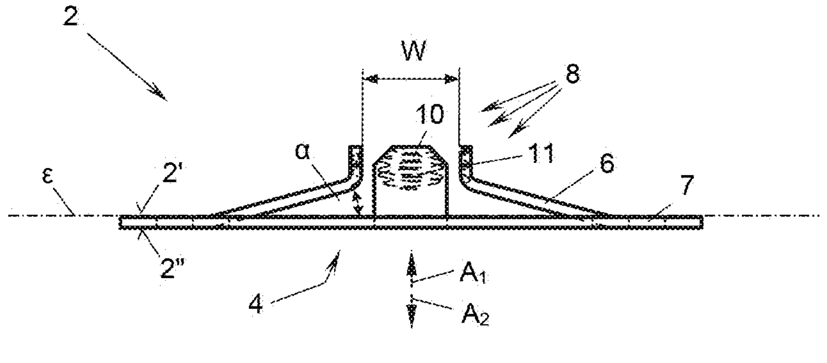
FIGS. 2*a* to 2*c* shows the plate of the connector of FIG. 1 in a side view (FIG. 2*a*), in plan view (FIG. 2*b*) or in a perspective view from above (FIG. 2*c*)
Figure 2B:
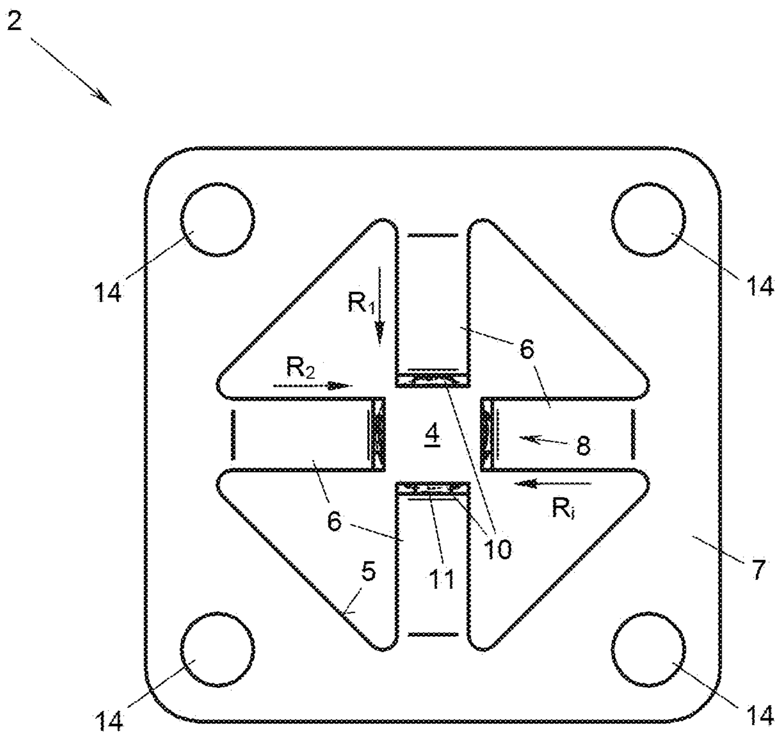
Figure 2C:
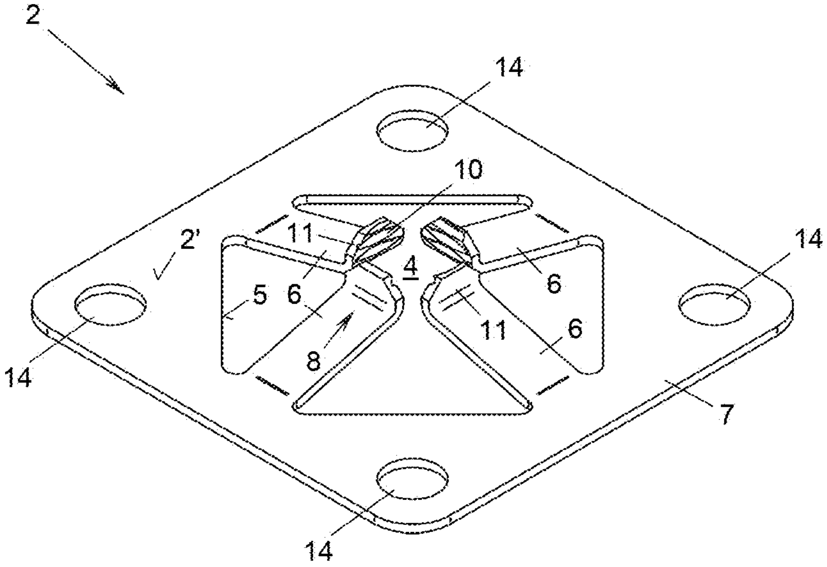

The end 8 of each spring tongue facing away from the periphery 5 of the opening 4 is free (FIG. 2*a*). The free end 8 of each spring tongue 6 has a threaded portion 10 corresponding to the thread 9 of the threaded bolt 3, with at least two thread turns for engaging with the thread 9, i.e. the threaded portion 10 has double-thread or multi-thread threads. A clear width W remains between the free ends 8 of the spring tongues 6, i.e. between the inner or nominal diameters of their threaded portions 10. Conversely, the threaded bolt 3 has a diameter D, i.e. a thread external or nominal diameter, which exceeds the remaining clear width W between the free ends 8 of the spring tongues 6.

If the threaded bolt 3, as shown in FIG. 1, is inserted into the opening 4, the free ends 8 of the spring tongues 6 bear against the threaded bolt 3, i.e. due to its larger diameter D relative to the clear width W, the threaded bolt 3 is locked on the plate 2, namely with its thread 9 in the threaded portions 10 of the free ends 8 of the spring tongues 6. Due to the resilience of the spring tongues 6 and their acute angle α relative to the plate plane ε, the threaded bolt 3 can simply be pushed or pressed further into the opening 4 in one normal direction $A_1$ onto the plate plane s, namely from the bottom side to the top side 2", 2' (in FIG. 1: upwards). In the process, the free ends 8 of the spring tongues 6 are each displaced upwards by the thread 9 of the threaded bolt 3 and forced outwards, in that the acute angles α are temporarily slightly increased against the spring action, in order to then lock again with their threaded portions 10 in the next respective thread of the threaded bolt 3. In the other normal direction $A_2$ opposite the normal direction $A_1$ mentioned above, the threaded bolt 3 is locked in relation to the plate plane ε because it cannot reduce the acute angle α of the spring tongues 6 relative to the plate s: to do so, it would have to expand the part 7 of the plate 2 remaining around the opening 4 over the spring tongues 6, which can be prevented by a suitable configuration of the plate 2.

In order to be able to form the two or more thread turns in the thread portions 10—e.g. by drilling, milling, cutting, pressing in or other means—the spring tongues 6 and their free ends 8 (and optionally the entire plate 2) have a thickness adapted to the thread 7. In the example of FIGS. 1 and 2*a* to 2*c*, the free end 8 of each spring tongue 6 alternatively has a collar portion 11, with the collar portions 11 of all spring tongues 6 together forming an almost closed collar. The collar or the collar portions 1 are essentially aligned in one of the two normal directions $A_1$, $A_2$ (here: in normal direction $A_1$), so that the plate or spring tongue thickness can be selected independently of the thread 7. The double-thread or multi-thread thread portions 10 are formed on the collar portions 11, and in plan view (FIG. 2*b*) are optionally circular.

Figure 3A:
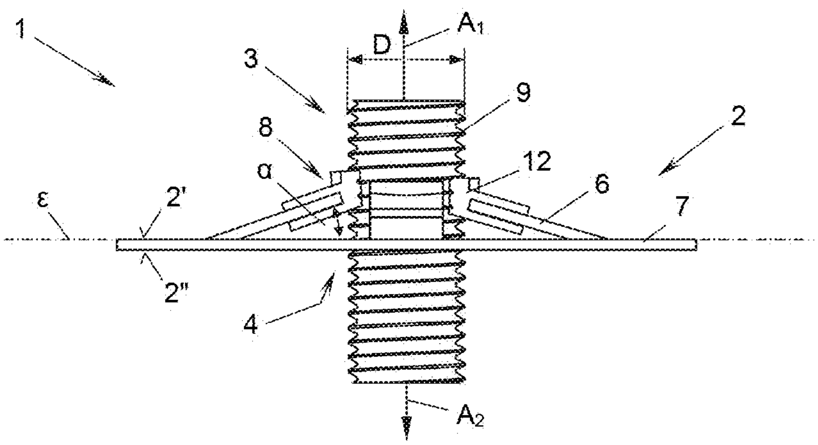
FIGS. 3*a* to 3*c* show a connector according to the disclosed subject matter in a side view (FIG. 3*a*), in a perspective view from above (FIG. 3*b*) and a detail thereof in a perspective view from above (FIG. 3*c*).
Figure 3B:
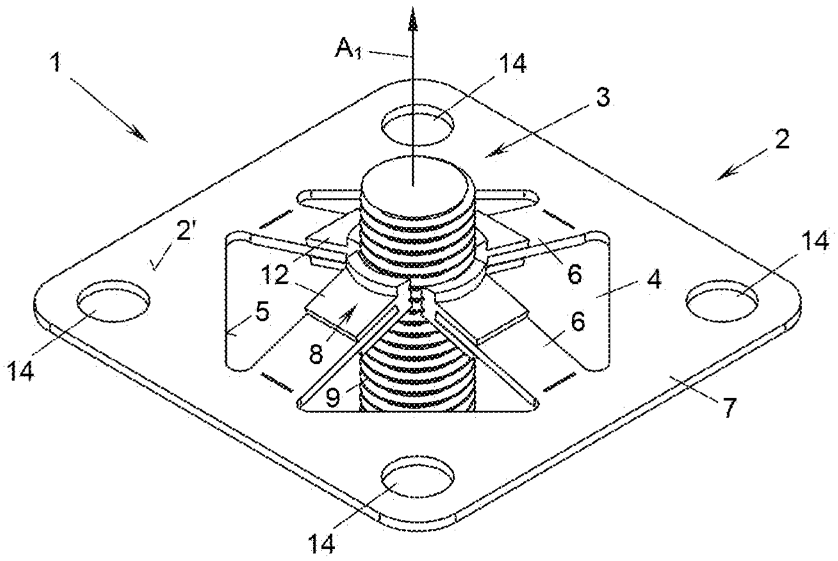
Figure 3C:
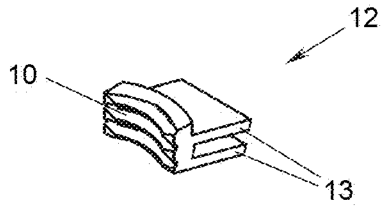

In the example of FIGS. 3*a* to 3*c*, the free end 8 of each spring tongue 6 is provided with an end cap 12. The respective thread portion 10 is formed on the end cap 12. The end caps 12 can either be removable and thus interchangeable, or they are securely attached to the spring tongues 6, e.g. bonded, welded, crimped or the like. Each end cap 12 has, for example, a pocket for being pushed over at least a part of the spring tongue 6. In the example of FIG. 3*c*, an end cap 12 has the form of a clamp with two clamping jaws 13, between which a part of a spring tongue 6 is inserted or clamped, respectively.

Depending on the requirements, the end caps 12 can be made of metal, for example steel, brass, etc. Alternatively, the end caps 12 are made of electrically and/or thermally insulating material, in particular plastic, e.g. fiber-reinforced plastic.

Of course, the plate 2 could have only two or three or conversely five or more spring tongues 6 of the aforementioned kind, instead of the four shown, in all variants. In any case, the spring tongues 6 can be distributed evenly around the periphery of the opening 4, as shown, so that in plan view all angles between any two adjacent spring tongues 6 are always the same, or they can be distributed non-uniformly. Also, for example a single spring tongue 6 could project radially into the opening 4 from one circumferential side of the opening 4 and two further spring tongues 6, which are closely adjacent to one another, could project radially into the opening 4 from the opposite, other circumferential side of the opening 4; in plan view, this optionally results in a mirror symmetry.

Said acute angle α in the shown examples is about 15° relative to the plate plane ε in the opening 4. In general, the said acute angle α is between 5° and 60°, but will usually be between 10° and 30°. It is also understood that the acute angle α in the relaxed state of the spring tongues 6, i.e. without the threaded bolt 3 being locked between the free ends 8 (FIG. 2*a*), is usually slightly smaller than when the threaded bolt 3 assumes its locked position (FIG. 1).

For connecting to the first component the plate 2 optionally has two or more (here: four) fastening bores 14 distributed around the opening 4, e.g. for fastening screws for screwing to the first component. Alternatively or in addition, the plate 2 can be bonded, welded etc. to the first component etc. or from the point of view of the threaded bolt 3 before it is inserted into the opening 4 behind the first component, and can be accessible to the threaded bolt 3 via a bore or the like passing through the first component, so that the plate 2 engages behind the first component in the locked position of the threaded bolt 3 and is connected to the first component by the pulling effect of the threaded bolt 3. This means that the plate 2 is connected to the first component on its top side 2', and on its bottom side 2" when engaging behind.

Similarly, the threaded bolt 3 for connecting to the second component can optionally have a flange (not shown). The flange could be configured as a screw head for applying a screwdriver, in which case the threaded bolt 3 would be a screw, alternatively the flange can be for example a bonded or welded flange and/or can also include fastening bores. Without a flange the threaded bolt 3 can optionally be screwed into the second component to form the connection.

The plate 2 is either made of metal, e.g. spring steel, or alternatively of plastic, in particular fiber-reinforced plastic, wood or another material. The threaded bolt 3 is also for example made of metal, plastic, in particular fiber-reinforced plastic, wood, if desired, or another material. In particular, the plate 2 and the threaded bolt 3 can be made of different materials.

The disclosed subject matter is not limited to the exemplary embodiments shown, but includes those variants, modifications and combinations thereof that fall within the scope of the accompanying claims.

What is claimed is:

1. A connector for two components comprising:

a plate connectable to the first of the two components, having a top side and a bottom side, an opening passing through the plate from the top side to the bottom side and at least two spring tongues distributed around a periphery of the opening, wherein each spring tongue projects radially into the opening and projects at an acute angle out of a plate plane on the top side of the plate, wherein a clear width remains between free ends of the spring tongues, and a threaded bolt connectable to the second of the two components, whose diameter exceeds the clear width remaining between the free ends of the spring tongues, wherein the free end of each spring tongue has a double-thread or multi-thread threaded portion corresponding to the thread of the threaded bolt, and wherein the free end of each spring tongue is provided with an end cap, on which the threaded portion is formed.

2. The connector according to claim 1, wherein the end caps are removable.

3. The connector according to claim 1, wherein the end caps are made of metal.

4. The connector according to claim 1, wherein the end caps are made of plastic.

5. The connector according to claim 1, wherein the plate is made of metal.

6. The connector according to claim 1, wherein the threaded bolt is made of metal.

7. The connector according to claim 1, wherein the acute angle is between 5° and 60° relative to the plate plane.

8. The connector according to claim 1 wherein the spring tongues are distributed evenly around the periphery of the opening.

9. The connector according to claim 1, wherein the plate for connecting to the first component has two or more fastening bores distributed around the opening.

10. The connector according to claim 1, wherein the threaded bolt for connecting to the second component has a flange.

11. The connector according to claim 1, wherein the plate is made of spring steel.

12. The connector according to claim 1, wherein the acute angle is between 10° and 30° relative to the plate plane.

* * * * *